United States Patent
Michi et al.

(10) Patent No.: US 7,184,874 B2
(45) Date of Patent: Feb. 27, 2007

(54) DEVICE FOR THE LONGITUDINALLY GUIDING A MOTOR VEHICLE

(75) Inventors: Harald Michi, Oelbronn-Duerrn (DE); Michael Scherl, Bietigheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 10/494,432

(22) PCT Filed: Sep. 17, 2002

(86) PCT No.: PCT/DE02/03482

§ 371 (c)(1),
(2), (4) Date: Sep. 29, 2004

(87) PCT Pub. No.: WO03/039925

PCT Pub. Date: May 15, 2003

(65) Prior Publication Data

US 2005/0038591 A1    Feb. 17, 2005

(30) Foreign Application Priority Data

Oct. 30, 2001 (DE) ................................ 101 53 527

(51) Int. Cl.
*B60K 31/00* (2006.01)
*B60T 7/22* (2006.01)

(52) U.S. Cl. ............................. 701/96; 701/70; 342/71

(58) Field of Classification Search ..................... None
See application file for complete search history.

(56) References Cited

U.S. PATENT DOCUMENTS

| | | | | |
|---|---|---|---|---|
| 6,385,527 | B1* | 5/2002 | Zumberge et al. | 701/91 |
| 6,560,525 | B1* | 5/2003 | Joyce et al. | 701/96 |
| 6,820,709 | B1* | 11/2004 | Zimmermann et al. | 180/169 |
| 2003/0135318 | A1* | 7/2003 | Tellis et al. | 701/96 |

FOREIGN PATENT DOCUMENTS

| | | |
|---|---|---|
| DE | 199 58 520 | 6/2001 |
| JP | 2000-326837 | * 11/2000 |

OTHER PUBLICATIONS

Winner et al., *Adaptive Cruise Control System—Aspects and Development Trends*, SAE Technical Paper Series 961010, International Congress and Exposition, Detroit, Feb. 26-29, 1996, pp. 27-36.

* cited by examiner

*Primary Examiner*—Michael J. Zanelli
(74) *Attorney, Agent, or Firm*—Kenyon & Kenyon LLP

(57) ABSTRACT

A device for the longitudinal guidance of a motor vehicle, having a speed sensor for measuring the driving speed of the vehicle; a distance sensor for measuring the distance to an obstacle possibly located in front of the vehicle; and a controller, which intervenes in the drive and brake system of the vehicle and regulates the driving speed, possibly as a function of the distance to the obstacle, in a closed-loop control circuit if the vehicle speed is above a certain limit speed, characterized by a control device, which intervenes in the drive and brake system in a controlling manner at driving speeds below the limit speed.

8 Claims, 2 Drawing Sheets

DEVICE FOR THE LONGITUDINALLY GUIDING A MOTOR VEHICLE

FIELD OF THE INVENTION

The present invention relates to a device for the longitudinal guidance of a motor vehicle, having a vehicle-speed sensor for measuring the driving speed of the vehicle, a distance sensor for measuring the distance to an obstacle possibly located in front the vehicle, and a controller, which intervenes in the drive and brake system of the vehicle and controls the driving speed in a closed-loop control circuit—possibly as a function of the distance to the obstacle—if the driving speed is above a certain limit speed. "Longitudinal guidance" is to be understood here as the control and regulation processes relating to the movement of the vehicle in the vehicle longitudinal direction, i.e., especially the control and regulation of the driving speed.

BACKGROUND OF THE INVENTION

Cruise controllers are known that allow the speed of the vehicle to be regulated to a driver-selected desired speed. One example of such a control system, which is also known as ACC system (Adaptive Cruise Control), is described in "Adaptive Cruise Control System—Aspects and Development Trends" by Winner, Witte, Uhler and Lichtenberg, Robert Bosch GmbH, in SAE Technical Paper Series 961010, International Congress and Exposition, Detroit, 26–29 Feb. 1996. Since these systems also include a distance sensor, for example in the form of a radar sensor, a stereo camera system or the like, it is possible to regulate the vehicle speed also in such a way that an appropriate safety distance to a vehicle driving ahead is maintained automatically.

However, since a full detection and reliable evaluation of the traffic surroundings is not yet possible with the available sensor systems, these systems are currently suited primarily to relative stable traffic situations such as driving on a highway or expressway. In contrast, in inner-city driving or when driving at low speed on winding roads, the uncertainties in the detection of the individual relevant target object may result in an accident risk. Consequently, known ACC systems are currently designed to allow activation only above a certain limit speed, such as above 40 km/h, for instance.

It has already been proposed to expand the application range of the ACC system to a traffic situation known as stop & go traffic and which occurs with a traffic jam or with slow-moving traffic, for example. This type of traffic situation is relatively stable, too, and thus suited for automatic distance control. However, the functionality must then be expanded in such a way that standing-start and stop processes are also able to be automated.

The speed sensor is currently formed by a system of dynamic wheel-speed sensors, which are already installed in vehicles having anti-lock braking systems or automatic traction control. However, since these wheel-speed sensors can detect the angle increments of the vehicle wheels only with limited resolution, the speed signal becomes unstable and unreliable at low speeds. This is another reason for the control being suspended at low speeds.

SUMMARY OF THE INVENTION

It is an object of the present invention to provide a device for the longitudinal guidance of a motor vehicle that allows the automatic operation to be extended to lower speeds without this requiring a more costly speed sensor.

According to the present invention, this objective is achieved by a control device, which intervenes in the drive and brake system in a controlling manner at driving speeds below the limit speed.

Due to the transition from closed-loop control to open-loop control, it is possible to achieve a longitudinal guidance that is independent of the signal from the speed sensor at driving speeds below the limit speed, so that faulty or missing signals of the speed sensor do not affect the behavior adversely. In this manner it is possible to realize a stop function, in particular, in which the vehicle, when pulling up to a stationary obstacle, for example the end of a traffic jam, is automatically braked to a standstill in a controlled manner. It is also possible to realize a stop & go function in which the vehicle is not only automatically braked to a standstill, but the renewed stand-start procedure and acceleration of the vehicle are automatically controlled, too, as soon as the traffic situation allows.

The term "control" in this connection means that the signal of the speed sensor is not used as feedback signal. This does not exclude that the control characteristic is modified as a function of the signals from the distance sensor, which in turn are indirectly influenced by the vehicle's own movement.

For instance, in this way it is also possible to control a typical stop & go situation in which the obstacle, i.e., the vehicle standing right in front of the own vehicle, begins to drive away and stops again after a brief moment. When the distance to the vehicle driving ahead is increased, the controlled power-take up of the own vehicle is triggered. During this standing-start procedure, it is possible to intervene in the control as a function of the measured distance even in those instances where the limit speed for the onset of the closed-loop control has not yet been reached, so that the vehicle driving ahead is not approached too closely. If necessary, it is also possible to switch back to a controlled braking into standstill again. If it is apparent from the distance data and relative-speed data measured by the radar system of the distance sensor that the vehicle driving ahead is moving at only very low speed, the controlled operation, in particular in vehicles having automatic transmission, may also consist in the control device releasing the brake and allowing the vehicle to roll at low speed, either with moderate acceleration or without acceleration and utilizing the speed-regulation function of the electronic engine management. In contrast, if the vehicle driving ahead moves away rapidly because the traffic jam has cleared up, the control device implements a further acceleration until the limit speed is reached and the longitudinal guidance is assumed by the controller once again.

Although the signals of the speed sensor, especially with respect to their time resolution, cannot be utilized for a satisfactory speed control, they may nevertheless be evaluated for other purposes within the scope of the longitudinal guidance, possibly following appropriate time averaging, for instance for the purpose of determining the absolute speed of the vehicle driving ahead by comparing the relative speed with the own driving speed, or for calculating the curve radius presently traversed by the own vehicle, on the basis of the driving speed and the yaw velocity of the vehicle measured in parallel by a yaw-velocity sensor. Knowledge of the curve radius may be important if a lane change of the own vehicle is to be detected in connection with the selection of the target object for the distance regulation or distance monitoring, or a turn-off procedure is to be detected in which the stop & go function should not be used for reasons of safety.

The change between open-loop control and closed-loop control may be implemented abruptly, by a switchover when reaching the limit speed, preferably using a certain hysteresis. However, in another embodiment a fluid transition may occur as well, for example in such a way that the output signals of the controller and the control device are weighted by weighting factors as a function of the speed and are then added, so that one can gradually transition from open-loop control to closed-loop control by changing the weighting factor.

For the control functions, the control device processes control programs, which are preferably predefined and whose selection and/or whose parameters may be modified as a function of the traffic situation detected by sensors.

DETAILED DESCRIPTION

Figure 1:
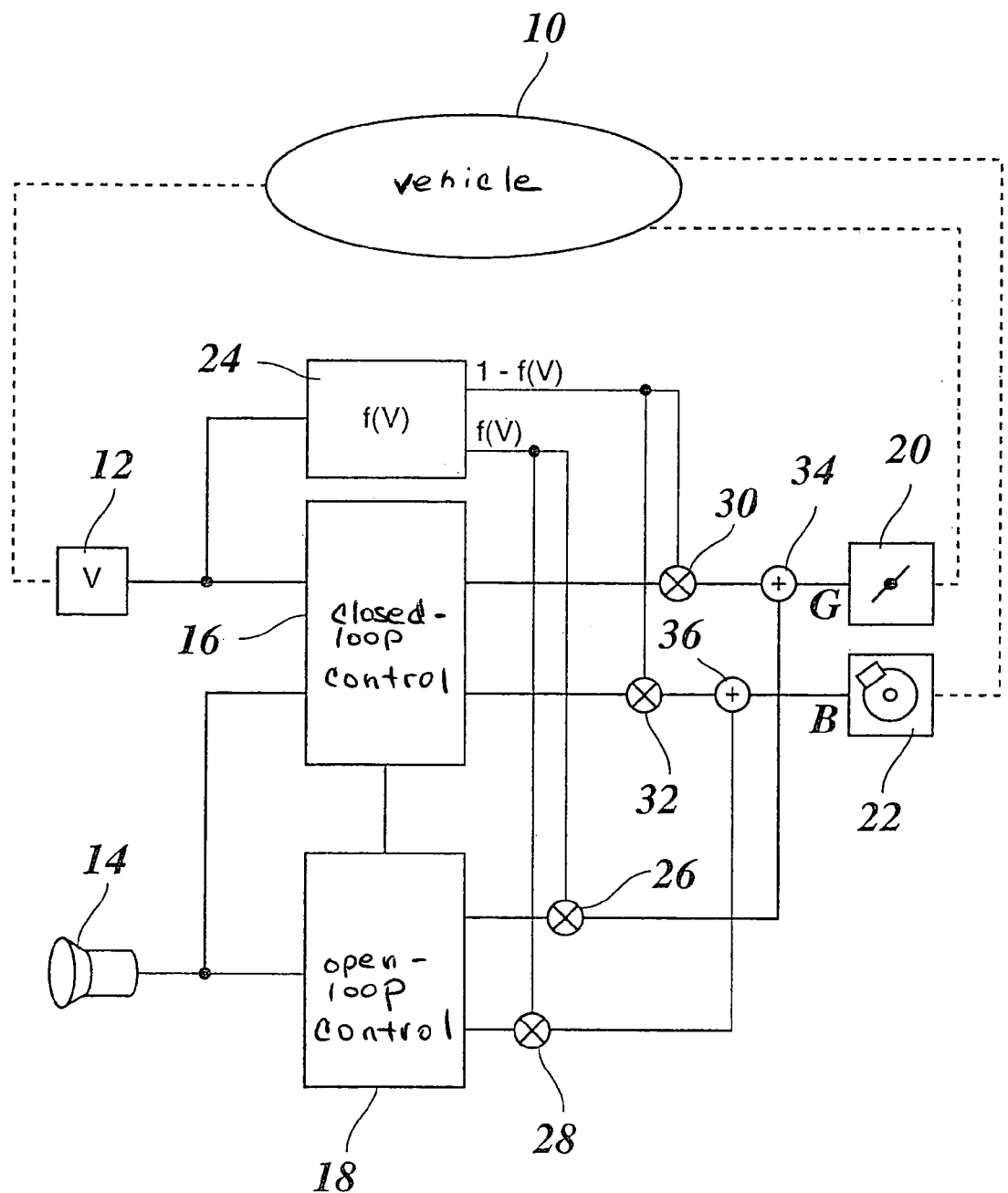
FIG. 1 shows a block diagram of the device according to the present invention.

The device for longitudinal guidance of a motor vehicle 10 shown in FIG. 1 includes a speed sensor 12, which measures the driving speed of the vehicle in a known manner, for example with the aid of conventional dynamic wheel-speed sensors; a distance sensor 14, in the form of a radar sensor, for instance, which measures the distance, the relative speed and possibly the direction with respect to another vehicle that is driving or stopping immediately in front of own vehicle 10; a controller 16 and a control device 18, which both intervene in drive system 20 and brake system 22 of vehicle 10 and are thereby able to influence the acceleration and braking behavior of the vehicle.

As an example, it is to be assumed that vehicle 10 is a vehicle having automatic transmission although the present invention is basically applicable, with obvious adaptations, to vehicles having manual transmission. The intervention in drive system 20 is made by an electronic signal, which may be equated in its significance to the activation of the accelerator pedal by the driver. The intervention in brake system 22 is made analogously, via an electronic signal that is the equivalent of a brake-pedal activation. The speed change of vehicle 10 caused by these interventions is detected by speed sensor 12 and reported to controller 16 as feedback signal, so that a closed-loop control circuit is formed.

In a so-called ACC mode (Adaptive Cruise Control) control device 18 is inactive and the driving speed is regulated solely by controller 16. If distance sensor 14 does not detect a vehicle driving in front, a desired speed set by the driver will be adjusted. If distance sensor 14 detects one or several vehicles driving ahead, the vehicle traveling directly in front in the own traffic lane will be selected as target object and the speed will be regulated in such a way that a safe distance is maintained from this vehicle, the distance being a function of the instantaneous driving speed. These regulating functions of an ACC system are known as such and for that reason are not discussed further here.

The ACC function may be activated only at driving speeds above a certain limit speed of 3 km/h, for example, since speed sensor 12 cannot record the instantaneous driving speed with sufficient accuracy at lower speeds, so that a stable regulation in a closed-loop control circuit is impossible. At low speeds, it is therefore switched from controller 16 to control device 18. Controller 16 and control device 18 may be formed by separate microcomputers or by software modules in one and the same microcomputer. A data exchange is possible between controller 16 and control device 18, so that the control device may access information that is available in the controller, and vice versa. In contrast to controller 16, however, control device 18 is able to react directly only to the position-finding signals of distance sensor 14 and not to the signal from speed sensor 12.

In the example shown, the switching between open-loop control and closed-loop control is implemented by a switchover module 24, which records the signal from speed sensor 12 and calculates therefrom a weighting factor f(V) as a function of the speed. Multiplication elements 26 and 28 weight the output signals of control device 18 intended for drive system 20 and brake system 22 by weighting factor f(V). Correspondingly, the output signals of controller 16 intended for drive system 20 and brake system 22 are weighted by weighting factor 1−f(V) by multiplication elements 30 and 32. The weighted output signals are added at summing points 34, 36 and the sums are transmitted as acceleration-control signal G and as brake-control signal B to drive system 20 or brake system 22. If weighting factor f(V) has the value 1, a pure open-loop control thus takes place, whereas a pure closed-loop control occurs when f(V)=0.

Figure 2:
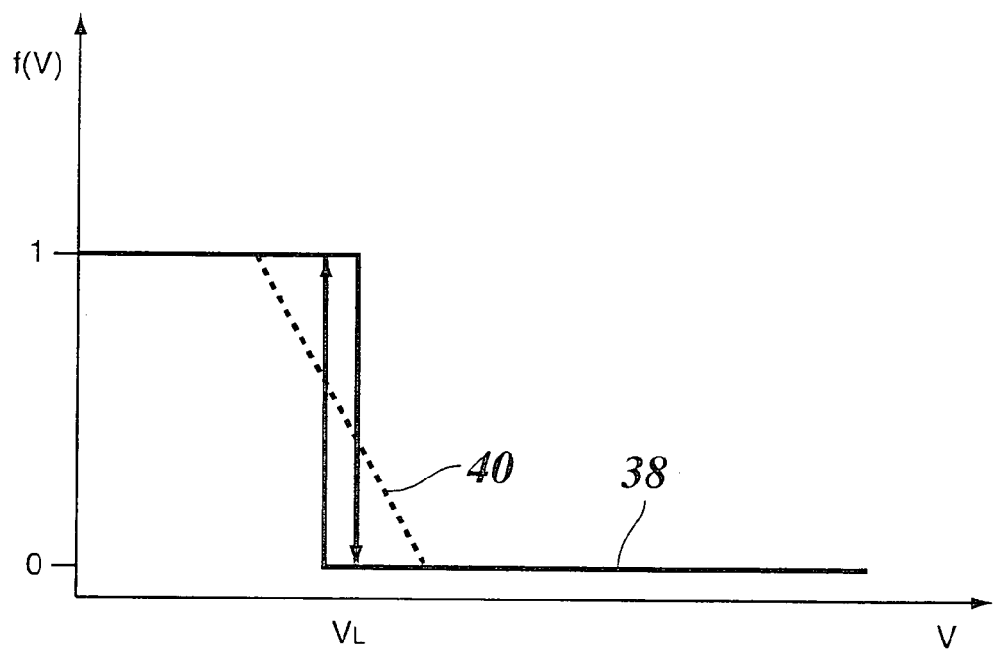
FIG. 2 shows a speed diagram to explain switching processes between open-loop control and closed-loop control operation/

A possible correlation between driving speed V and weighting factor f(V) is illustrated by hysteresis curve 38 marked by solid lines in FIG. 2. If the ACC function is active and driving speed V falls below a certain limit speed V (such as 3 km/h), for example when pulling up to the end of a traffic jam, f(V) is abruptly increased from 0 to 1, i.e., a switch takes place from closed-loop control to open-loop control. When the driving speed increases again to a value slightly above $V_L$ within the framework of the open-loop control, it is abruptly switched back again to closed-loop control. As an alternative, dashed curve 40 illustrates a fluid transition between open-loop control and closed-loop control.

Two typical open-loop control functions of control device 18, namely braking to standstill and the power take-up, are now discussed with reference to FIG. 3.

Figure 3:
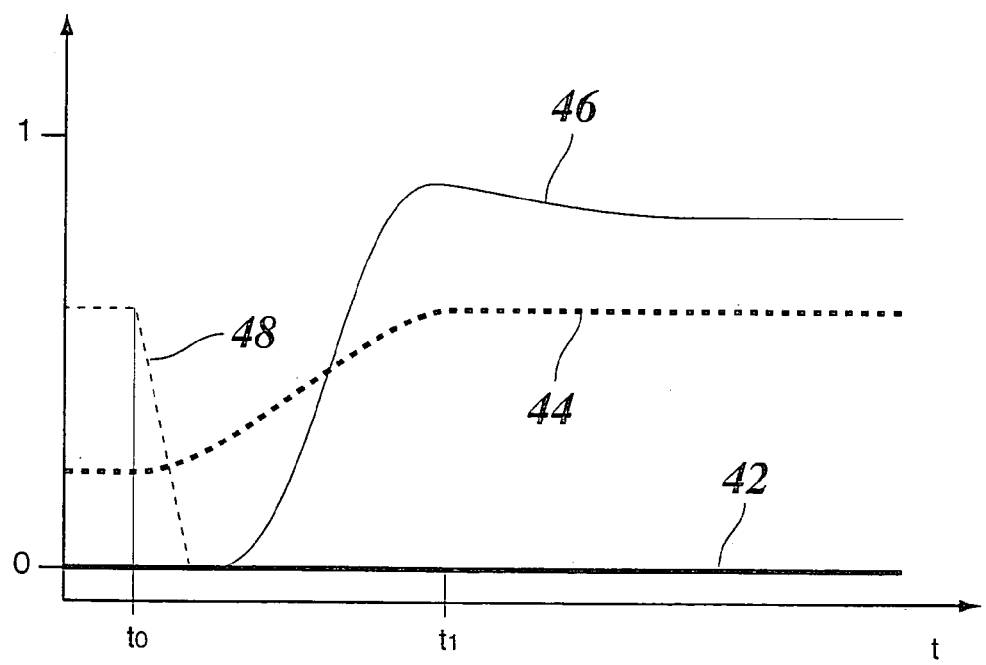
FIG. 3 shows a time diagram to explain control functions for the take-up of power and braking to standstill.

In the event that the vehicle is braked to standstill, bold solid curve 42 in FIG. 3 indicates the time characteristic of acceleration control signal G that is forwarded to drive system 20, using any desired unit. Curve 44 drawn in as a dotted bold line shows the corresponding characteristic of brake control signal B. Controller 16 is still active up to time $t_0$. The vehicle is decelerated within the framework of the distance-dependent regulation.

Acceleration-control signal G has the value 0 and brake-control signal B has a specific value that is determined by the function of controller 16. At instant $t_0$ the driving speed falls below $V_L$, and a switch is made to open-loop control according to hysteresis curve 38 (FIG. 2). To avoid an abrupt transition, the initial values of acceleration-control signal G and brake-control signal B, which are output by control device 18, are adapted to the corresponding values of controller 16. In the time interval between $t_0$ and $t_1$, control device 18 then implements a linear increase of the brake-control signal to a value that is high enough to brake the vehicle to standstill between instants $t_0$ and $t_1$ in a controlled manner. Meanwhile, acceleration-control signal G retains value 0. Starting with instant $t_1$ the brake-control signal is maintained at the attained value so that the vehicle will not begin to roll again.

Control device 18 is designed such that it may vary instant $t_1$, and correspondingly also the rate of increase of the brake-control signal, between $t_0$ and $t_1$ as a function of the distance data and relative speed data forwarded by distance sensor 14. In this way, the stop procedure is controlled in such a way that it may not occur too abruptly on the one hand, and that vehicle 10 does not pull up too closely to the target object on the other hand.

Curves 46 and 48, which are indicated by thinner lines, illustrate the take-up of power from standstill. Curve 46 indicates acceleration-control signal G and curve 48 the brake-control signal B. The brake is retained up to instant $t_0$, and acceleration-control signal is 0. At instant $t_0$, distance sensor 14 detects that the vehicle driving ahead has begun to move, and the automatic power take-up function is triggered in control device 18. Brake-control signal 48 drops to 0 within a short period of time, and as soon as the brake has been released, acceleration-control signal (curve 46) is gradually increased to a relatively high value, so that the vehicle is accelerated. After reaching a peak value, the acceleration-control signal is slightly reduced again, so that the vehicle is further accelerated at moderate acceleration. The exact time characteristic of curve 46 is able to be determined in control device 18 for example by look-up in a table or by a mathematical function. In continued acceleration, the vehicle will reach limit speed $V_L$ at a certain point and the hysteresis jump velocity at which a switch to closed-loop control is made again.

During the acceleration phase, the signal from distance sensor 14 is monitored by control device 18, too, and acceleration-control signal 46 will be reduced, if required, or the control function "brake to standstill" will be initiated again.

In the example shown here, the stop function (braking to standstill) and the power take-up function for whose execution control device 18 is required, are combined with the usual ACC functions, in such a way that the change between stop & go and the ACC mode takes place without driver intervention. However, it may be useful to allow functions such as braking to standstill and the power take-up from standstill only within the framework of a special stop & go function, which must be activated by the driver via a special command. The change from stop & go mode to ACC mode, too, is then possible only via an active driver intervention (by inputting a key command, for example). In this case, the ACC mode is preferably configured as pure closed-loop mode and may be activated only above 20 km/h, whereas in the stop & go mode a change is possible between closed-loop control and open-loop control, while the desired speed is limited to maximally 40 km/h, for example, in closed-loop operation.

What is claimed is:

1. A device for a longitudinal guidance of a motor vehicle, comprising:
   a speed sensor for measuring a driving speed of the vehicle;
   a distance sensor for measuring a distance to an obstacle possibly located in front of the vehicle;
   a controller that intervenes in a drive and brake system of the vehicle and regulates the driving speed in a closed-loop control circuit if the driving speed is above a certain limit speed; and
   a control device that intervenes in the drive and brake system for an open-loop control at driving speeds below the limit speed.

2. The device as recited in claim 1, wherein:
   the controller regulates the driving speed as a function of the distance to the obstacle.

3. The device as recited in claim 1, wherein:
   a stop function for an automatic braking of the vehicle to a standstill is implemented in the control device.

4. The device as recited in claim 3, wherein:
   a power take-up function for an automatic control of a power take-up of the vehicle from a standstill is implemented in the control device.

5. The device as recited in claim 1, wherein:
   at least one of a stop function and a power take-up function is able to be activated and deactivated as a function of at least one signal from the distance sensor.

6. The device as recited in claim 1, further comprising:
   a switchover module for automatically switching between the open-loop control and the closed-loop control as a function of the driving speed.

7. The device as recited in claim 6, wherein:
   a switchover between the open-loop control and the closed-loop control is performed in accordance with a hysteresis function.

8. The device as recited in claim 6, wherein:
   a transition between the closed-loop control and the open-loop control is implemented in a fluid manner, by cross-fading of output signals of the control device and the controller.

* * * * *